United States Patent
Van Gaasbeck

(10) Patent No.: US 10,474,370 B1
(45) Date of Patent: Nov. 12, 2019

(54) METHOD AND SYSTEM FOR MITIGATING THE EFFECT OF WRITE AND READ DISTURBANCES IN SOLID STATE MEMORY REGIONS

(71) Applicant: EMC Corporation, Hopkinton, MA (US)

(72) Inventor: Richard H. Van Gaasbeck, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 15/195,727

(22) Filed: Jun. 28, 2016

Related U.S. Application Data

(60) Provisional application No. 62/339,634, filed on May 20, 2016.

(51) Int. Cl.
*G06F 12/00* (2006.01)
*G06F 3/06* (2006.01)

(52) U.S. Cl.
CPC .......... *G06F 3/0616* (2013.01); *G06F 3/0649* (2013.01); *G06F 3/0659* (2013.01); *G06F 3/0688* (2013.01)

(58) Field of Classification Search
CPC ... G11C 16/26; G06F 12/0264; G06F 3/0679; G06F 3/0688; G06F 3/0616; G06F 3/0649; G06F 3/0659; G06F 3/688
See application file for complete search history.

(56) References Cited

U.S. PATENT DOCUMENTS

| | | |
|---|---|---|
| 6,000,006 A | 12/1999 | Bruce et al. |
| 8,041,884 B2 | 10/2011 | Chang |
| 8,700,840 B2 | 4/2014 | Paley et al. |
| 8,891,303 B1 | 11/2014 | Higgins et al. |
| 2004/0228197 A1 | 11/2004 | Mokhlesi |
| 2005/0055495 A1 | 3/2005 | Vihmalo et al. |
| 2007/0294490 A1 | 12/2007 | Freitas et al. |

(Continued)

OTHER PUBLICATIONS

Qureshi et al.; "Enhancing Lifetime and Security of PCM-Based Main Memory with Start-Gap wear Leveling"; IBM Research, T.J. Watson Research Center; {moinqureshi, franceschini, viji, lastrasl, abali, karidis}@us.ibm.com; Dec. 12, 2009; 10 pages.

(Continued)

*Primary Examiner* — Arvind Talukdar
(74) *Attorney, Agent, or Firm* — Chamberlain, Hrdlicka, White, Williams & Aughtry

(57) ABSTRACT

A method for mitigating the effect of write disturbances in solid state memory. The method includes receiving a request to write to a memory location of the solid state memory, writing to the memory location, identifying a disturbed memory location, identifying a memory region that includes the disturbed memory location, identifying an address, in the memory region, of the disturbed memory location, generating an address hash from the address, and making a first determination that a history of disturbed memory locations in the memory region includes the address hash. The method further includes, based on the first determination, clearing the history of disturbed memory locations, making a second determination that a wear level operation is due, and based on the second determination, performing the wear level operation.

20 Claims, 9 Drawing Sheets

(56) References Cited

U.S. PATENT DOCUMENTS

| | | |
|---|---|---|
| 2009/0168505 A1 | 7/2009 | Hanzawa et al. |
| 2010/0172180 A1 | 7/2010 | Paley et al. |
| 2011/0299317 A1 | 12/2011 | Shaeffer et al. |
| 2012/0131304 A1 | 5/2012 | Franceschini et al. |
| 2013/0262749 A1* | 10/2013 | Oikawa ............... G06F 11/004 711/103 |
| 2013/0325401 A1 | 12/2013 | Bouchard |
| 2014/0146609 A1* | 5/2014 | Avila .................. G06F 11/106 365/185.17 |
| 2014/0219034 A1 | 8/2014 | Gomez et al. |
| 2014/0226413 A1 | 8/2014 | Gomez et al. |
| 2014/0369124 A1 | 12/2014 | Moon et al. |
| 2015/0221358 A1 | 8/2015 | Brandl |
| 2015/0380110 A1 | 12/2015 | Tamura et al. |
| 2016/0027481 A1 | 1/2016 | Hong |
| 2016/0034194 A1* | 2/2016 | Brokhman .......... G06F 12/0246 711/103 |
| 2016/0148700 A1 | 5/2016 | Oh |
| 2017/0068468 A1 | 3/2017 | Rothberg |
| 2017/0084344 A1 | 3/2017 | Choi et al. |

OTHER PUBLICATIONS

"Microsoft Computer Dictionary"; Microsoft Publishing, Fifth Edition; 2002; p. 567.

Feng Chen et al; "CAFTL: A Content-Aware Flash Translation Layer Enhancing the Lifespan of Flash Memory based Solid State Drives"; Proceedings of FAST'11: 9th USENIX Conference on File and Storage Technologies; Feb. 2011; pp. 77-85.

Patterson; "Computer Organization and Design"; Morgan Kaufman, Fifth Edition; 2014; p. 381.

Samuel H. Russ et al.; "Simulation-based Optimization of Wear Leveling for Solid-State Disk Digital Video Recording"; IEEE Transactions on Consumer Electronics, vol. 60, No. 3; IEEE; Aug. 2014; pp. 363-367.

Youngjae Kim et al, "FlashSim: A Simulator for NANO Flash-based Solid-State Drives"; 2009 First International Conference on Advances in System Simulation, IEEE; 2009; pp. 125-131.

* cited by examiner

METHOD AND SYSTEM FOR MITIGATING THE EFFECT OF WRITE AND READ DISTURBANCES IN SOLID STATE MEMORY REGIONS

CROSS-REFERENCE TO RELATED APPLICATIONS

This application claims priority to U.S. Provisional Patent Application No. 62/339,634 filed May 20, 2016, the entire disclosure of which is hereby expressly incorporated by reference herein.

BACKGROUND

Solid state memory storage devices may be used to store data. Such solid state storage devices may be based on solid state memory such as, for example, Phase Change Memory (PCM) and Spin Torque Magnetic Random Access memory, that degrades as data are written to the memory. Writes to and/or reads from a solid state memory location may perturb other memory locations, thus weakening the data stored in these other memory locations.

DETAILED DESCRIPTION

Figure 1A:
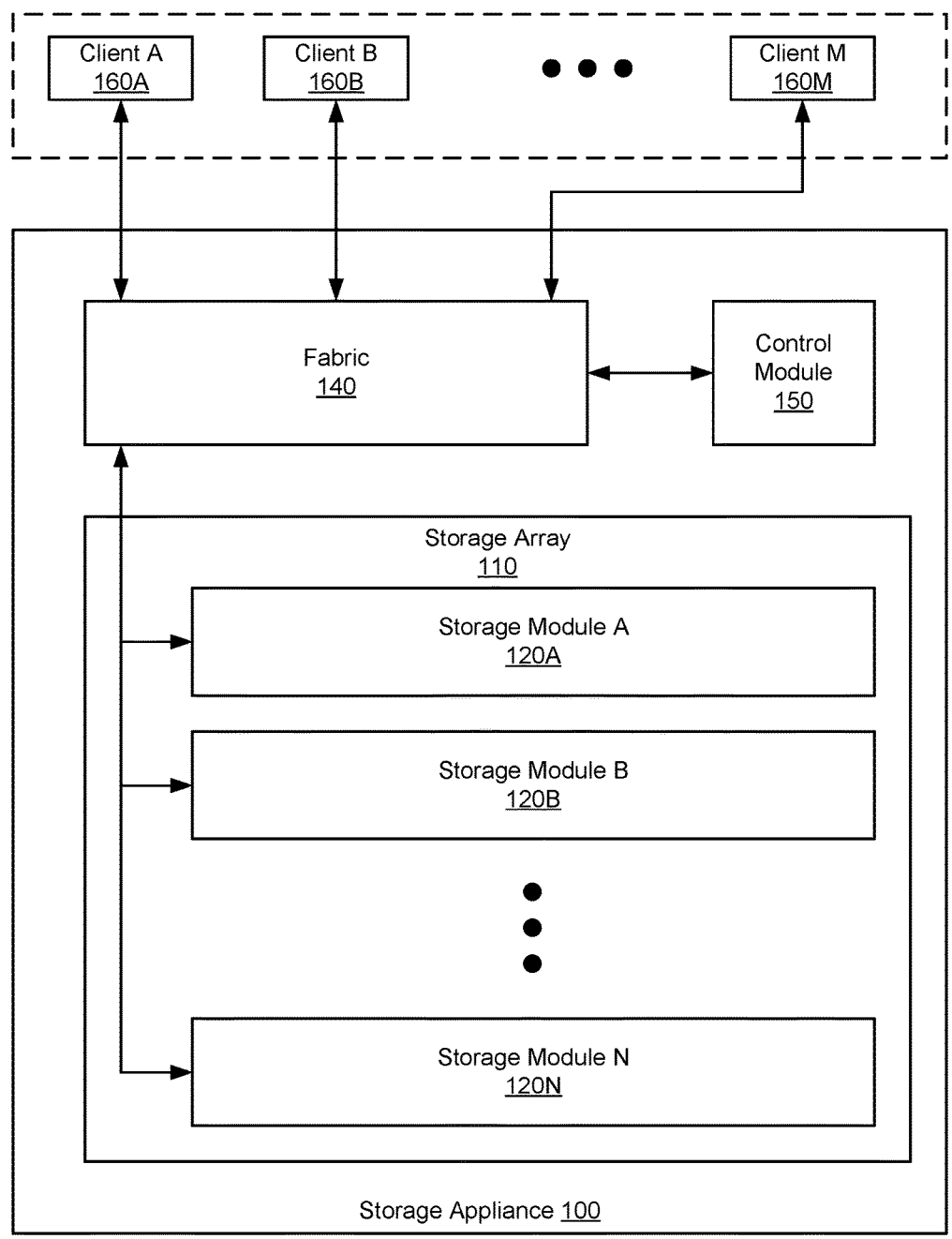
FIGS. 1A-1D show systems, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-5, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to mitigating the effect of write and/or read disturbances in solid state memory regions. A write or read disturbance may affect a memory location when data are written to or read from, respectively, another memory location. Consider a memory location that stores a single bit, e.g., a state that is either "1" or "0". The state may be represented by a charge level, e.g., with the state "1" being represented by a charge being stored at the memory location and with the state "0" being represented by a charge not being stored at the memory location. The charge level stored at the memory location may be disturbed due to operations (writes or reads) directed to other memory locations. The charge stored at the memory location may change due to charge leakage that may occur in particular when adjacent memory locations are accessed, as the flow of current to/from these adjacent locations may induce charge leakage at the memory location. In solid state memory where memory locations are densely packed in close proximity, this leakage may be particularly pronounced. If the memory location is repeatedly disturbed, the charge level stored at the memory location may become ambiguous, and it may thus no longer be identifiable whether the charge level at the memory location represents a "0" or a "1" state. To preserve the intended charge level of the memory location, the memory location may thus require a rewrite to refresh the charge at the memory location. Those skilled in the art will appreciate that although write/read disturbances that are based on charge leakage are described, the technology is not limited to write/read disturbances that are based on this particular phenomenon. Rather, write/read disturbances, in accordance with an embodiment of the technology may be based on any phenomenon where a write/read in one memory location has the potential to alter (e.g., weaken) data at another memory location.

The rewrite may be performed by a wear level operation. Although wear level operations may also be used to address the uneven wear of memory locations in solid state memory, in one or more embodiments of the technology, a wear level operation, when performed on a memory location that requires a refreshing of the charge level, cures the memory location by restoring the charge level to represent the desired state stored at the memory location.

FIGS. 1A-1D show systems in accordance with one or more embodiments of the technology. Referring to FIG. 1A, the system includes one or more clients (client A (160A)-client M (160M)) that are operatively connected to a storage appliance (100).

In one embodiment of the technology, the clients (160A-160M) may be any type of physical system that includes functionality to issue a read request to the storage appliance (100) and/or to issue a write request to the storage appliance (100). Though not shown in FIG. 1A, each of the clients (160A-160M) may include a client processor (not shown), client memory (not shown), and any other software and/or hardware necessary to implement one or more embodiments of the technology.

In one embodiment of the technology, the clients (160A-160M) are configured to execute an operating system (OS) that includes a file system, a block device driver, an application programming interface (API) to enable the client to access the storage appliance, and/or a user programming library. The file system, the block device driver and/or the user programming library provide mechanisms for the storage and retrieval of files from the storage appliance (100). More specifically, the file system, the block device driver and/or the user programming library include functionality to perform the necessary actions to issue read requests and write requests to the storage appliance. They may also provide programming interfaces to enable the creation and deletion of files, reading and writing of files, performing seeks within a file, creating and deleting directories, managing directory contents, etc. In addition, they may also provide management interfaces to create and delete file systems. In one embodiment of the technology, to access a file, the operating system (via the file system, the block device driver and/or the user programming library) typically provides file manipulation interfaces to open, close, read, and write the data within each file and/or to manipulate the corresponding metadata.

In one embodiment of the technology, the clients (160A-160M) interface with the fabric (140) of the storage appliance (100) to communicate with the storage appliance (100), as further described below.

In one embodiment of the technology, the storage appliance (100) is a system that includes persistent storage such as solid state memory, and is configured to service read requests and/or write requests from one or more clients (160A-160M).

The storage appliance (100), in accordance with one or more embodiments of the technology, includes one or more storage modules (120A-120N) organized in a storage array (110), a control module (150), and a fabric (140) that interfaces the storage module(s) (120A-120N) with the clients (160A-160M) and the control module (150). Each of these components is described below.

The storage array (110), in accordance with an embodiment of the technology, accommodates one or more storage modules (120A-120N). The storage array may enable a modular configuration of the storage appliance, where storage modules may be added to or removed from the storage appliance (100), as needed or desired. A storage module (120), in accordance with an embodiment of the technology, is described below, with reference to FIG. 1B.

Continuing with the discussion of the storage appliance (100), the storage appliance includes the fabric (140). The fabric (140) may provide connectivity between the clients (160A-160M), the storage module(s) (120A-120N) and the control module (150) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

Further, in one or more embodiments of the technology, the storage appliance (100) includes the control module (150). In general, the control module (150) is a hardware module that may be configured to perform administrative tasks such as allocating and de-allocating memory regions in the solid state memory modules (120A-120N) and making allocated memory regions accessible to the clients (160A-160M). Further, the control module may perform one or more steps to ensure the integrity of data stored in a solid state memory region and/or to balance the wear within the memory region. In one embodiment of the technology, these functions (e.g., one or more of the steps described in FIGS. 3-5) are performed by the control module (150).

The control module (150) interfaces with the fabric (140) in order to communicate with the storage module(s) (120A-120N) and/or the clients (160A-160M). The control module may support one or more of the following communication standards: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE), or any other communication standard necessary to interface with the fabric (140).

Figure 1B:
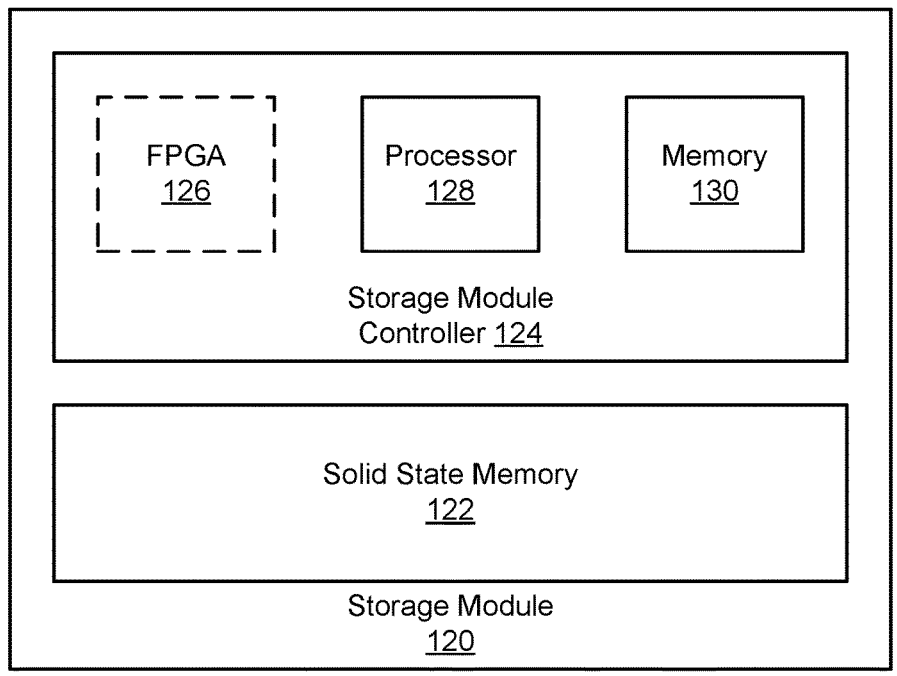

FIG. 1B shows a storage module, in accordance with one or more embodiments of the technology. The storage module (120) includes solid state memory (122) to persistently store data. In one embodiment of the technology, the solid state memory (122) of the storage module (120) may include, but is not limited to, Spin Torque Magnetic Random Access Memory (ST-RAM) and Phase Change Memory (PCM). Generally, the solid state memory (122) may correspond to any type of memory that has a finite number of program-erase cycles or write cycles. In one or more embodiments of the technology, the limited number of program-erase or write cycles necessitates the use of methods to avoid excessive writes to the same region of the solid state memory in order to prevent data loss, as described in detail below.

Continuing with the discussion of the storage module (120), shown in FIG. 1B, the storage module (120), in accordance with one or more embodiments of the technology, further includes a storage module controller (124). In one embodiment of the technology, the storage module controller (124) is configured to receive and service requests to read from and/or write data to the solid state memory (122). These requests may originate from the clients (160A-160M) or from the control module (150), and may be conveyed to the storage module controller (124) via the fabric (140). Further, the storage module controller (124) may perform or may support administrative tasks including the methods described in FIGS. 3-5.

Figure 3:
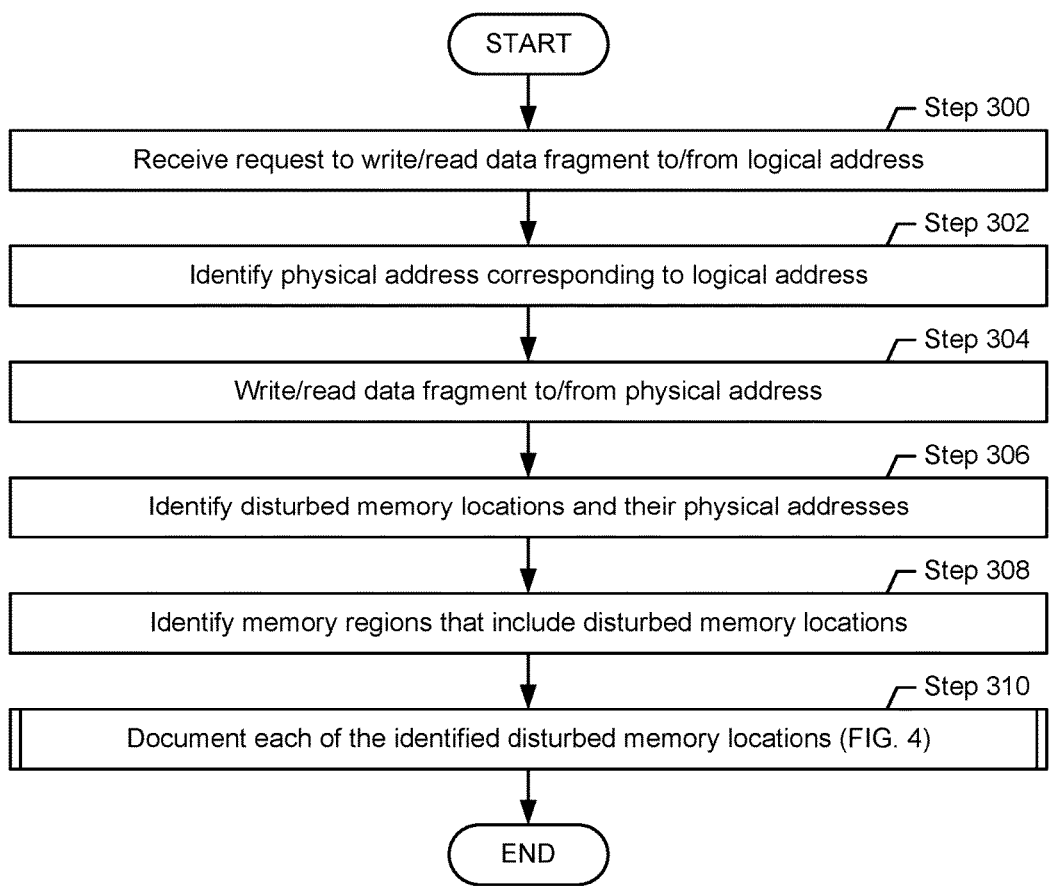
FIGS. 3-5 show flowcharts, in accordance with one or more embodiments of the technology.
Figure 4:
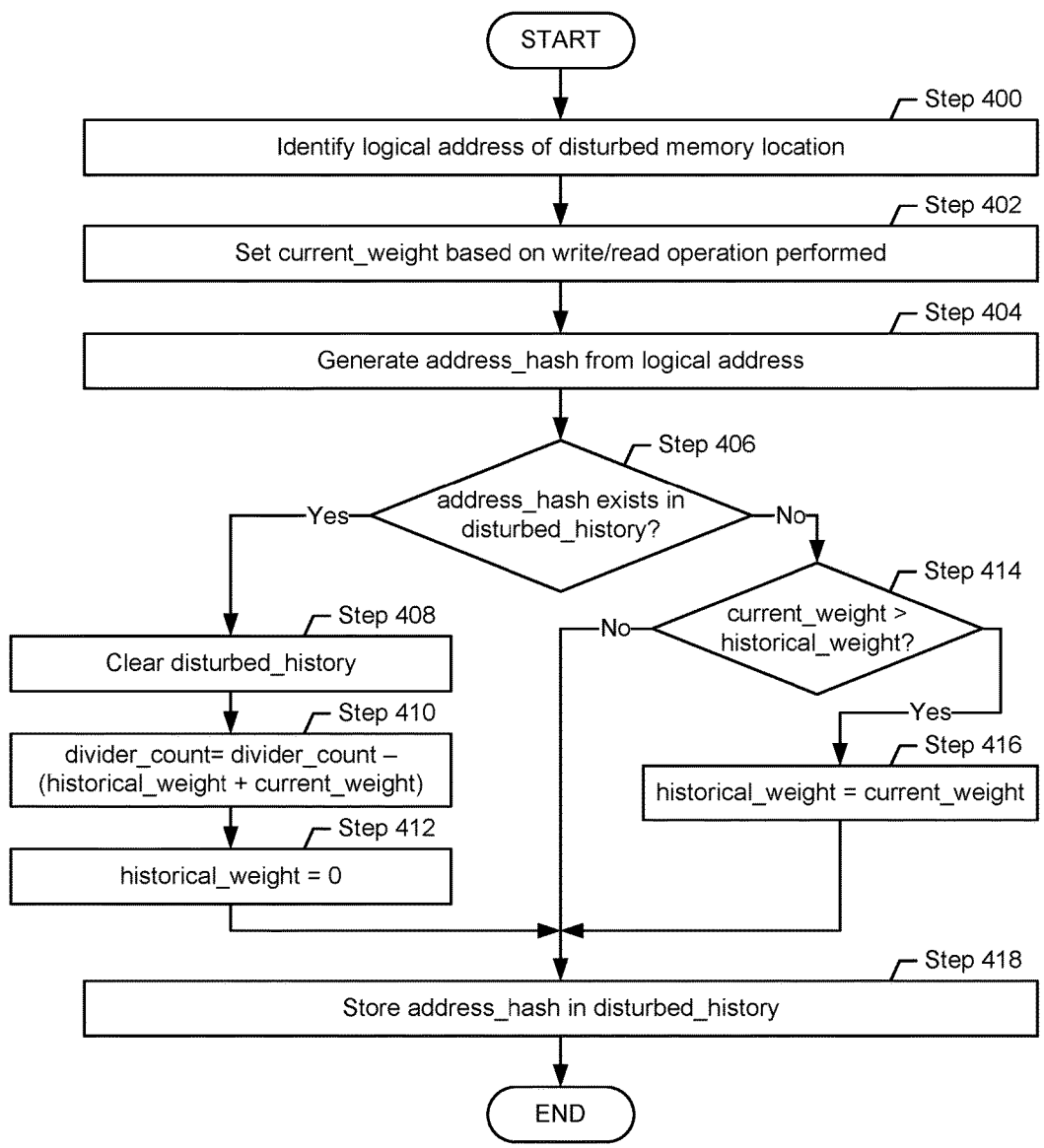

In one embodiment of the technology, the storage module controller (124) includes a processor (128) (e.g., one or more cores, or micro-cores of a processor that are configured to execute instructions) and memory (130) (e.g., volatile memory that may be, but is not limited to, dynamic random-access memory (DRAM), synchronous DRAM, SDR SDRAM, and DDR SDRAM) to perform at least one of the steps described in FIGS. 3 and 4. Alternatively or additionally, the storage module controller (124) may include a field-programmable gate array (FPGA) and/or an application-specific integrated circuit (ASIC) (126). In a storage module controller that includes an FPGA and/or ASIC and a processor, the FPGA and/or ASIC may primarily service read and write requests, whereas the processor may handle or support administrative tasks, including those related to addressing the effect of write/read disturbances, as further described below.

Figure 1C:
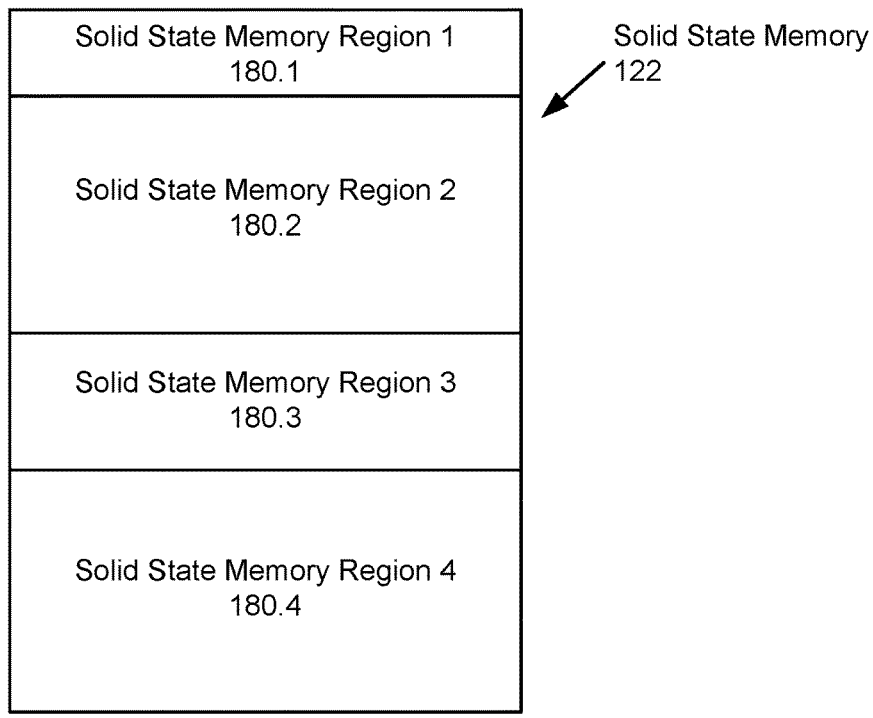

FIG. 1C shows the logical organization of exemplary solid state memory (122), in accordance with an embodiment of the technology. The solid state memory is segmented into multiple solid state memory regions (180.1-180.4). Each solid state memory region may be separately administrated for the purpose of orchestrating read/write access to memory locations in a memory region and for the purpose of addressing write/read disturbances and for performing wear level operations. Each solid state memory region may be of a certain size, spanning a smaller or larger region of the solid state memory. A solid state memory region may also occupy the entire solid state memory.

Figure 1D:
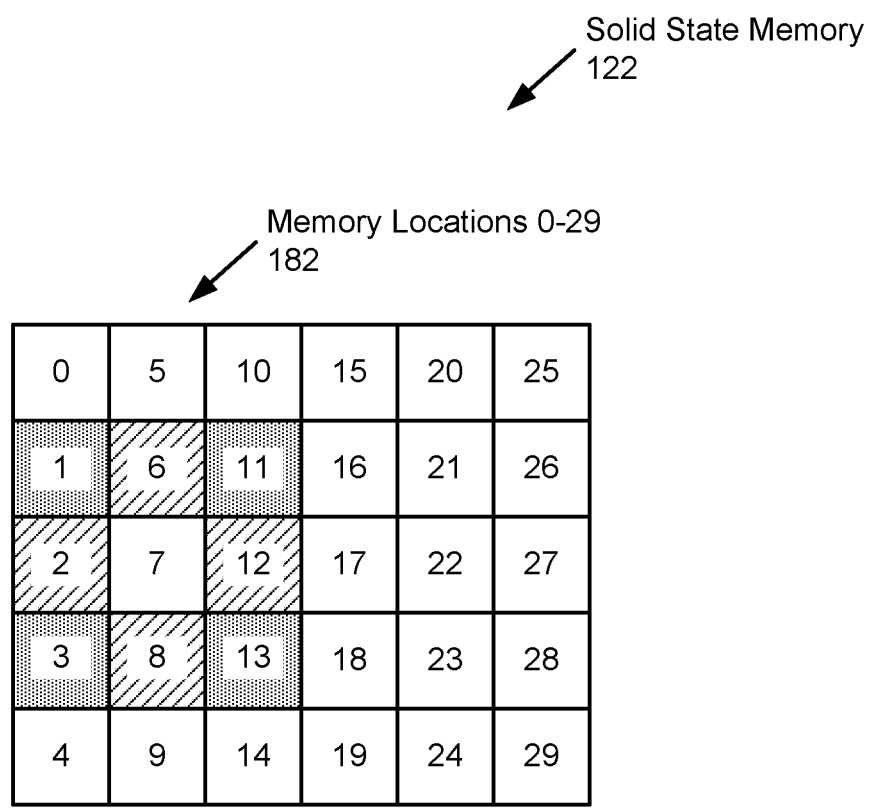

FIG. 1D shows the physical organization of exemplary solid state memory (122), in accordance with an embodiment of the technology. The combination of the solid state memory locations 0-29 (182) form the solid state memory. Each memory location may include a number of bits (e.g., if a memory location is configured to store a single variable only), or it may span larger regions, e.g., bytes, kilobytes, megabytes, etc. The size of a memory location may also be specific to the type of solid state memory being used. In one embodiment of the technology, a memory location is the smallest individually addressable memory unit in the solid state memory region (280). Each memory location may have a physical address (physical addresses 0-29, in the exemplary solid state memory of FIG. 1D), and the physical addresses may be arranged in a particular order, e.g. in rows and columns, or in any other sequential or non-sequential order.

FIG. 1D further illustrates the effect of write/read disturbances, in accordance with an embodiment of the technology. In exemplary solid state memory (122), a write is performed in memory location 7. The write operation also affects the surrounding memory locations 1, 2, 3, 6, 8, 11, 12 and 13. Memory locations 2, 6, 8, and 12 (diagonal hatch pattern) are disturbed by the write and are therefore considered disturbed memory locations. Further memory locations 1, 3, 11, and 13 (dotted hatch pattern) are also affected by the write, although to a lesser extent because they are more distant from memory location 7, in comparison to memory locations 1, 3, 11 and 13. Accordingly, memory locations 1, 3, 11, and 13 are also considered disturbed memory locations.

One skilled in the art will recognize that the architecture of the system is not limited to the components and the configuration of the components shown in FIGS. 1A-1D. For example, the components of the storage appliance (100) may include any number of storage modules (120A-120N). Further, the storage module controller (124) of the storage module (120) and the control module (150) of the storage appliance (100) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology. Also, referring to FIGS. 1C and 1D, the logical and physical organization of the solid state memory may vary, without departing from the technology. For example solid state memory may include any number of solid state memory regions of any size, and the memory locations that form the solid state memory may be arranged in any way, in two or three-dimensional structures. The physical organization may depend, for example on the type and/or manufacturing of the solid state memory. Depending on the organization, density, manufacturing, and/or other parameters, a disturbed memory location may be differently affected by a write/read directed to another memory location. Generally, the degree of disturbance may increase with increasing proximity of the memory locations. Also, a write operation may cause more of a disturbance than a read operation.

While FIG. 1D shows a physical organization of a solid state memory region, above-discussed FIG. 1C shows a logical organization of a solid state memory region. In one or more embodiments of the technology, the coexistence of physical and logical organizations implies that a read/write, targeting a particular memory location that, in the logical representation, is in one memory region, may disturb other memory locations that may be in the same and/or in different memory regions.

Figure 2A:
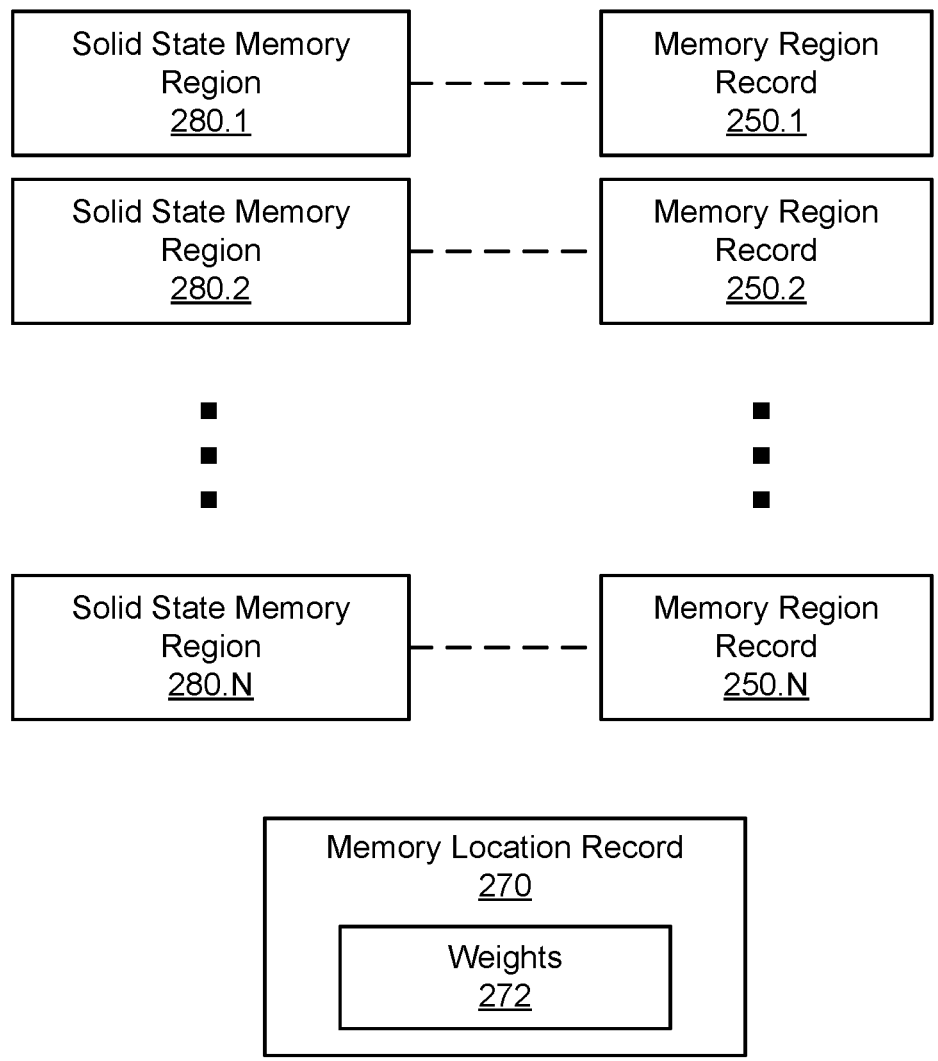
FIGS. 2A-2C show an organization of solid state memory, in accordance with one or more embodiments of the technology.
Figure 2B:
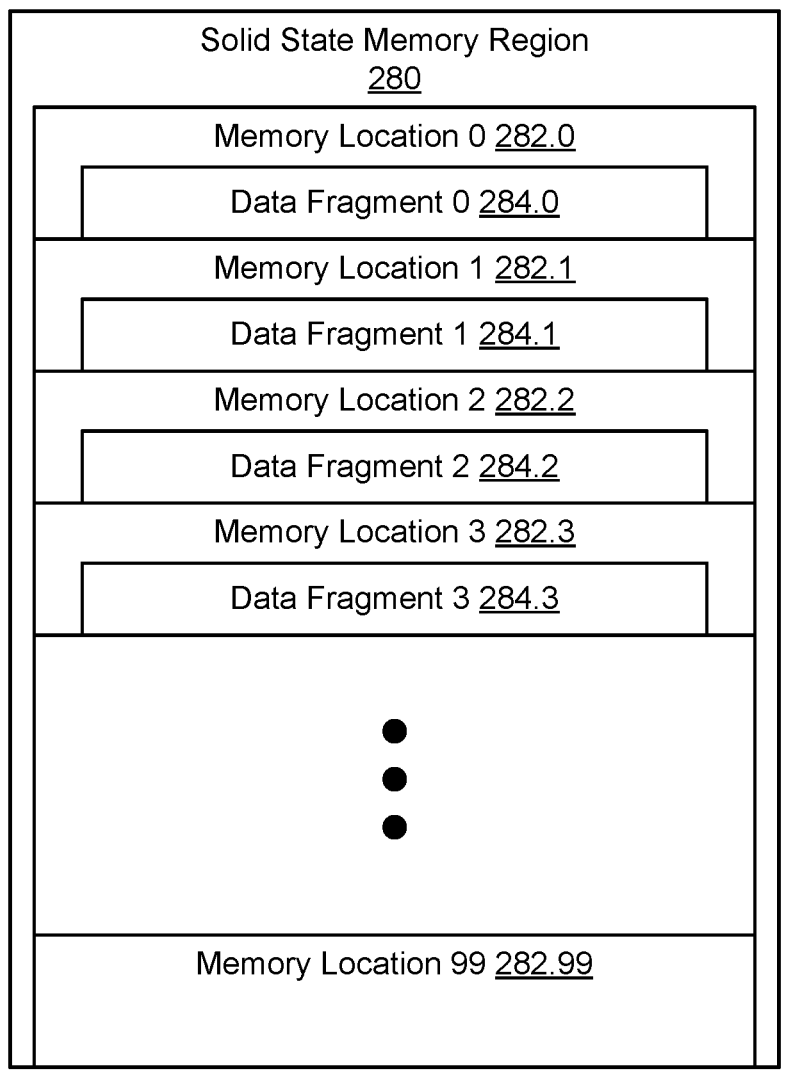
Figure 2C:
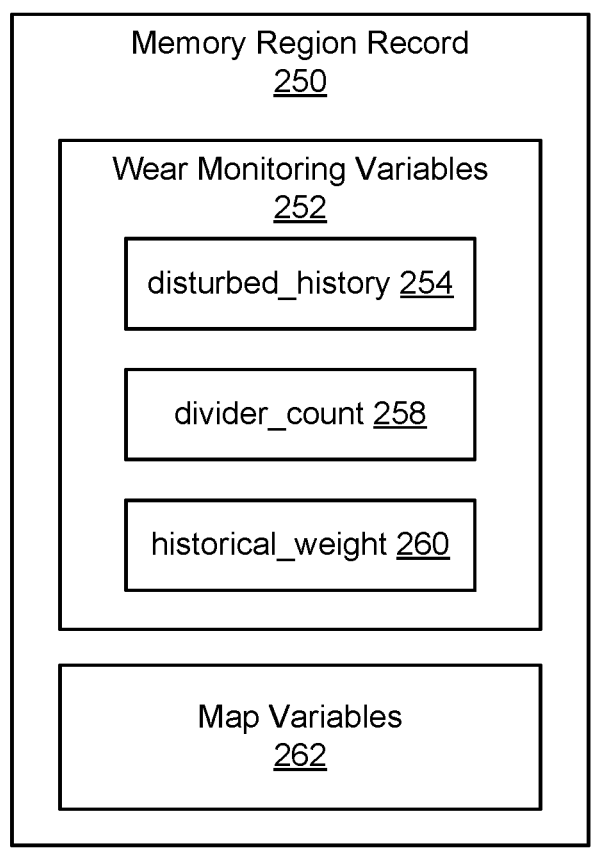

FIG. 2A-2C show an organization of solid state memory, in accordance with one or more embodiments of the technology. FIG. 2A shows solid state memory region (280.1-280.N) and associated memory region records (250.1-250.N). Each solid state memory region (280.1-280.N) may be a memory region allocated in the solid state memory (122) of a storage module (120) and may be used to store data. A solid state memory region may be of any size and may be structured in any way. A solid state memory region (280.1-280.N) may be addressed and maintained using elements of the associated memory region record (250.1-250.N), as further described below. FIG. 2A further shows a memory location record (270). The memory location record, in accordance with an embodiment of the technology, documents, for all or for at least some memory locations, whether and how the writing to/reading from one memory location disturbs another memory location. Consider, for example, the exemplary solid state memory shown in FIG. 1D. As previously discussed, a read/write operation performed at one memory location may disturb surrounding memory locations. The surrounding memory locations may be affected differently, e.g., depending on the geometry, type and design of the solid state memory. The degree to which a surrounding memory location is affected by a read/write operation, in accordance with an embodiment of the technology, is documented by a weight (272). A larger weight may indicate that a memory location is more severely disturbed than a smaller weight. In one embodiment of the technology, the memory location record (270) includes weights for at least those memory locations that are measurably disturbed by a write/read. Consider the exemplary solid state memory (122) of FIG. 1D. In the illustrated case of a write being performed to memory location 7, weights are documented for memory locations 1, 2, 3, 6, 8, 11, 12, and 13. Different memory locations are affected differently by the write to memory location 7, and the weights therefore differ. The weights for memory locations 2, 6, 8, and 12 may be relatively larger than the weights for memory locations 1, 3, 11 and 13.

In one embodiment of the technology, weights may be documented for any combination of a memory location that is being written to/that is being read from and a memory location that is disturbed by the write/read. For example to document the disturbance caused by a write to memory location 0, weights may be included in the memory location record for surrounding memory locations 1, 5, and 6. For memory location 23, weights may be included in the memory location record for memory locations 17, 18, 19, 22, 24, 27, 28, and 29. Discrete values may be used for documenting weights. For example, one larger weight may be used to represent larger disturbances and one smaller value may be used to represent smaller disturbances. Additional discrete values may be used if a finer granularity is desired, or the weights may even be represented as continuous values, without departing from the technology. Those skilled in the art will appreciate that the memory location record may include weights for any memory location that may be disturbed by a read/write operation directed to any other memory location. Separate weights may be used for read and write operations because the degree of disturbance may differ, for example, depending on whether a read or a write operation is performed. A read may cause less of a disturbance than a write. The weights may be stored in any form, e.g., in a database, table or spreadsheet, or in the form of a model that represents the solid state memory, and from which weights can be extracted as needed.

FIG. 2B shows an exemplary physical representation of data in a solid state memory region (280). Data in the solid state memory region (280) may be stored as data fragments (284) in memory locations (282) of the solid state memory region (280). The exemplary solid state memory region in FIG. 2B includes 100 memory locations (282.0-282.99) to accommodate 100 data fragments. Each memory location may be a sub region of a specified size, in the solid state memory region. A memory location may be occupied by a data fragment (e.g., data fragments 0-3 (284.0-284.3), or it may be empty (e.g., memory location 99 (282.99). A combination of data fragments may form a storage object, e.g., a data file. The data fragments of a storage object may or may not be in consecutive order and/or they may be interrupted by one or more gaps. Further, the order and/or location of the data fragments may change over time, e.g., when a wear level operation is performed.

Turning to FIG. 2C, a memory region record is shown. A memory region record (250), in accordance with one or more embodiments of the technology, includes wear monitoring variables (252) and map variables (262) for a specific memory region (e.g., a separate memory region record (250) may be maintained for each of the exemplary memory regions (180.1-180.4) shown in FIG. 1C). The memory region record (250) may be stored in the memory (130) of the storage module controller (124) and may be relied upon by the FPGA (126) and/or the processor (128) to determine the need for wear level operations and to direct read and/or write operations to the appropriate region in the solid state memory (122) of the storage module (120).

The wear monitoring variables (252) may be used to track disturbed memory locations and to initiate wear level operations when deemed necessary, as described below with reference to FIGS. 3-5. The wear monitoring variables may include, but are not limited to, a variable "disturbed_history" (254), a variable "divider_count" (258) and a variable "historical_weight" (260).

disturbed_history (254), in accordance with one or more embodiments of the technology, is used to detect repeated disturbances of the same memory locations of the solid state memory region. When a disturbance of a particular memory location is detected, an entry is made in disturbed_history, for the disturbed memory location. In one embodiment of the technology, the address of the disturbed memory location is stored in disturbed_history as a hash value. One or more hash values may be generated by one or more hash functions from the address of the disturbed memory location. The one or more hash values may be within a range that is based on the choice and parameterization of the hash function(s) being used. The size of disturbed_history is chosen accordingly. Consider for example, a scenario in which a solid state memory region includes 32,000 memory locations. Rather than registering disturbances separately for each of the 32,000 memory locations, the address of a disturbed memory location may be provided to the hash function to obtain a hash value in a limited range, e.g., in a range from 0 to 63. In the described exemplary scenario, a set of 64 bits is used to encode hash values. Assume, for example, that the hash value for the first memory location of the 32,000 memory locations, generated by a first hash function is "0". Accordingly, the first bit of the 64 bit disturbed_history would be set to "1". Further assume that the hash value for the first memory location of the 32,000 memory locations, generated by a second hash function is "49". Accordingly, the 50$^{th}$ bit of the 64 bit disturbed_history would also be set to "1". disturbed_history may thus be used as a compact representation for documenting writes to a comparatively large memory region. The use of hash values and disturbed_history to represent disturbed memory locations is further described below in FIGS. 3 and 4.

divider_count (258), in accordance with one or more embodiments of the technology, is used to control the frequency of wear level operations to be performed. divider_count may be decremented with each detected repeated disturbance of a memory location. The use of divider_count is further described below in FIGS. 3-5. Prior to the execution of the methods of FIGS. 3-5, divider_count may be initialized to a value specified by divider_limit Accordingly, the value of divider_limit, in combination with the decrement applied in response to detecting repeated disturbances of memory locations, govern the frequency of wear level operations.

historical_weight (260), in accordance with an embodiment of the technology, is used to document the weight, obtained from the memory location record, that is associated with a disturbance of a memory location that has previously occurred. This weight may thus be associated with a memory location that was registered in disturbed_history when a disturbance of that memory location was detected. The historical weight, in combination with the weight associated with the disturbance that triggered the detection of a repeated disturbance of a memory region, in accordance with an embodiment of the technology, is used to control how soon a wear level operation is to be performed. In one embodiment of the technology, only a single historical weight value is maintained, even though many memory locations may be stored in disturbed_history. How historical_weight is determined, even though the many memory locations that may be stored in disturbed history may all have different weights, is discussed in detail below, with reference to FIGS. 3-5.

The map variables (262) may be used to establish a mapping between logical addresses used, e.g., by clients (160) to address memory locations when reading from or writing to the memory locations and the actual physical addresses of the memory locations of the memory region. The logical to physical mapping enabled by the map variable (262) may establish offsets between logical and physical addresses, may implement address randomization, etc. The map variables (262) may include, for example, entries that specify a physical start address of the memory region, the size of the memory region, the memory location of a first data fragment of a series of consecutive data fragments, etc. The composition of the map variables (262) may depend on the type of wear level algorithm being used. For example, the map variables may also include an entry for the location of one or more gaps that may be used to periodically relocate data fragments to different memory locations when performing a wear level operation. The map variables may change when a wear level operation is performed, in order to update the mapping between logical and physical representations, to reflect the updated organization of data fragments in the memory region.

Figure 5:
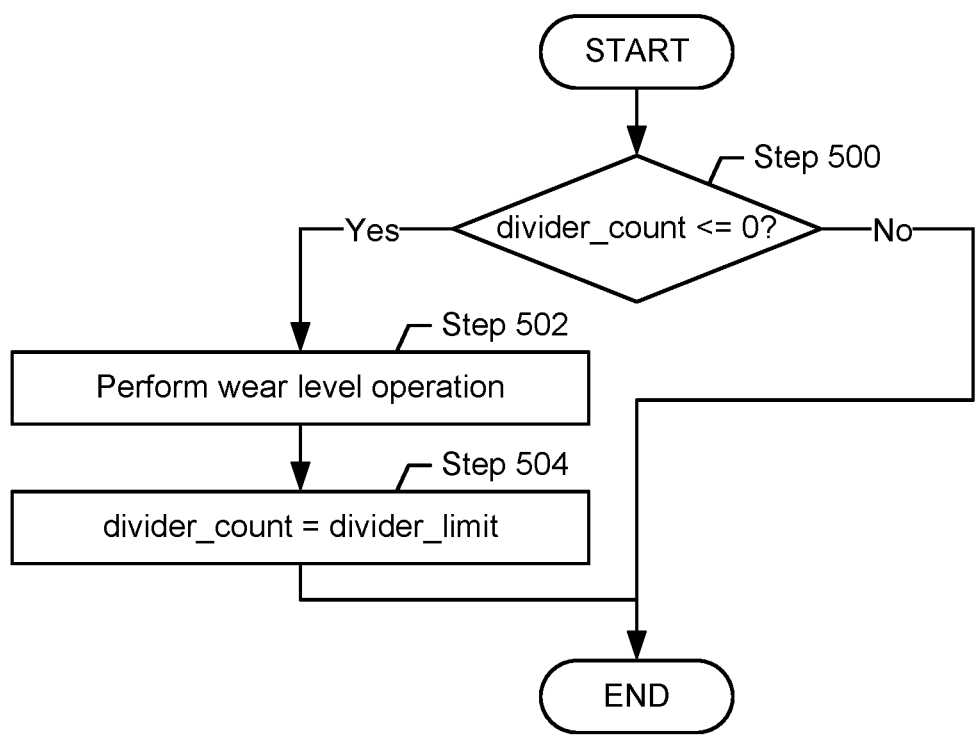

FIGS. 3-5 show flowcharts in accordance with one or more embodiments of the technology. FIGS. 3 and 4 show methods for detecting the disturbance of memory locations in a memory region, resulting from write/read operations performed in the solid state memory region. FIG. 5 shows a method for treating the solid state memory region, once disturbed memory locations are detected, to mitigate the effects of the disturbances.

The methods of FIGS. 3-5 may be repetitively executed, e.g., each time a write request is received. While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-5 may be performed in parallel with any other steps shown in FIGS. 3-5 without departing from the technology.

FIG. 3 shows a method for performing a write or read operation in a solid state memory region, and for detecting the disturbance of memory locations in a memory region, resulting from the write/read operation.

Turning to FIG. 3, in Step 300, a write/read request to write a data fragment to or read a data fragment from, respectively, a solid state memory region is received. The request may use a logical address to indicate the memory location to be addressed. The request may have been received from a client attempting to write to or read from the solid state memory of the storage appliance. The request may be received by the storage appliance and may reach the storage module controller of the storage module to which the client is attempting to write or from which the client is attempting to read. The request, in accordance with an embodiment of the technology, includes a logical address to be written to or to be read from (e.g., memory location 1, 2, 3, etc., as illustrated in FIG. 2B).

In Step 302, the physical address corresponding to the logical address is identified. This address translation may enable the storage appliance to identify the targeted memory location in a particular memory region. The address translation may be performed by the storage module controller, e.g., by an FPGA of the storage module controller that may be specialized in rapidly performing logical to physical address translations during write or read operations. The address translation may be based on the mapping established by the map variables in the memory region record. As previously described with reference to FIG. 2A, multiple memory regions may coexist. Accordingly, the memory region record associated with the memory region that includes the targeted memory location is relied upon.

In Step 304, the data fragment is written to or read from, respectively, the memory location identified by the physical address of the memory location in the solid state memory region.

In Step 306, memory locations, disturbed by the write/read access, are identified. The disturbed memory locations may be identified based on a documented relationship between memory locations. This relationship may be obtained from the memory location record, for example, in a lookup operation if the memory location record is a table, or by querying the solid state memory model if the memory location record is a model of the solid state memory. The physical address may be obtained for each of the disturbed memory locations. Consider, for example, the scenario of FIG. 1D in which a write to memory location 7 is performed. In this scenario, the memory locations returned in Step 306 may include memory locations 1, 2, 3, 6, 8, 11, 12, and 13.

In Step 308, the memory regions in which the disturbed memory locations are located, are identified. The identification may be performed based on the coexisting physical and logical representations of the solid state memory, as previously with reference to FIGS. 1C and 1D. As previously noted, the disturbed memory locations are not necessarily located in the memory region where the write/read operation was performed and may instead be located in different memory regions.

In Step 310, each of the disturbed memory locations, identified in Step 306, are documented. In one or more embodiments of the technology, the documentation may track the disturbed memory locations in order to, eventually, trigger a wear level operation to mitigate the effect of the disturbances. Step 310, in accordance with an embodiment of the technology, may be executed separately for each disturbed memory location. The details of Step 310 are described in FIG. 4.

FIG. 4 shows a method for documenting a disturbed memory location. In one embodiment of the technology, the execution of the method is specific to the memory region in which the disturbed memory location is located. Thus, separate instances of FIG. 4 may be executed for different memory regions. For example, if a first disturbed memory location is located in a first memory region, the documentation of the first disturbed memory location may be performed by a first instance of the method described in FIG. 4, and if a second disturbed memory location is located in a second memory region, the documentation of the second disturbed memory location may be performed by a second instance of the method described in FIG. 4. If a third disturbed memory location is again located in the first memory region, the documentation of the third memory location may again be performed by the first instance of the method described in FIG. 4. The different instances of the method of FIG. 4 may execute entirely independently from one another.

Turning to FIG. 4, in Step 400, the logical address of the disturbed memory location is identified. The logical address may be obtained from the physical address (identified in Step 306) by translation, using the map variables of the memory region in which the disturbed memory location is located (identified in Step 308).

In Step 402, a variable that describes the degree of disturbance, "current_weight", caused in the disturbed memory region, is set. current_weight may be set by looking up the weight in the memory location record, as described in FIG. 2A.

In Step 404, an address hash, "address_hash", is generated from the logical address identified in Step 400. Alternatively, the address hash may be generated from the physical address corresponding to the logical address. The address hash may include one or more hash values. Each of the hash values may be generated from the address of the disturbed memory location, using hash functions configured to generate hash values that are independent from one another. In one embodiment of the technology, two hash values are generated by two independent hash functions. In one embodiment of the technology, the output of the hash functions is in a specified range, e.g., 0 . . . 63. Any hash function capable of accepting addresses of disturbed memory locations in the range of the solid state memory region and capable of producing hash values of the specified output size may be used.

In Step 406, a determination is made about whether address_hash exists in the history of disturbed memory locations, stored in disturbed_history. Consider, for example, a scenario in which address_hash=22. To make the determination about whether the address hash exists in the history of disturbed memory locations, the $23^{rd}$ bit (representing the value "22", in a zero-based representation) of disturbed_history is inspected. If, in Step 404, multiple hash values, generated by multiple hash functions, are used to represent an address of a disturbed memory location, the determination in Step 406, in accordance with an embodiment of the technology, verifies whether all hash values of address_hash exist in disturbed_history. Only if all hash values exist in disturbed_history, the determination that address_hash exists in disturbed_history may be made. If a determination is made that address_hash exists in disturbed_history, the method may proceed to Step 408.

In Step 408, disturbed_history is cleared, e.g., by setting all values of disturbed_history to "0". In Step 410, divider_count is decremented. More specifically, divider_count is decremented by an amount that includes historical_weight and current_weight. The subtracted amount is thus governed by the weight associated with the currently processed disturbed memory location and the weight(s) associated with a disturbed memory location that was processed during previous execution cycles of the method of FIG. 4 (by a previous execution of Step 414 and optionally Step 416). Subsequently, in Step 412, historical_weight is reset to zero.

Returning to Step 406, if a determination is made that address_hash does not exist in disturbed_history, the method may proceed to Step 414.

In Step 414, a determination is made about whether current_weight is greater than historical_weight. If current_weight is not greater than historical_weight, the method may directly proceed to Step 418. If current_weight is greater than historical_weight, the method may proceed to Step 416.

In Step 416, historical_weight is set to current_weight. Steps 414 and 416 in combination thus store the highest weight associated with the most severe disturbance in historical_weight, by maintaining the value of historical_weight if historical weight is greater than current_weight, and by overwriting historical_weight with current_weight if current_weight is greater than historical_weight. This approach ensures that, in Step 410, divider_count is sufficiently reduced to trigger a timely wear level operations (as discussed in FIG. 5), without requiring the tracking of individual weights for all memory locations represented by disturbed_history.

In Step 418, address_hash is stored in disturbed_history. In the previously-described scenario in which address_hash=22, the 23$^{rd}$ bit of disturbed_history would be set to "1".

FIG. 5 shows a method for treating the solid state memory region, once disturbed memory locations are detected, to mitigate the effects of the disturbances. Analogous to the method of FIG. 4, separate instances of the method of FIG. 5 may execute, if the solid state memory is segmented into multiple memory regions.

Turning to FIG. 5, in Step 500, a determination is made about whether divider_count, as a result of the decrementing performed in Step 410 of FIG. 4, is less than or equal to zero. The determination thus assesses whether one or more memory locations have been sufficiently disturbed by reads/writes addressing other memory locations to warrant a wear level operation. If so, the method may proceed to Step 502.

In Step 502, a wear level operation is performed. The wear level operation, in accordance with an embodiment of the technology, reassigns data fragments to different memory locations. In one embodiment of the technology, the wear level operation includes a step-wise circular rotation of the data fragments in the memory region. In a single wear level operation, a memory fragment may, for example, be copied into an adjacent gap, i.e., to a memory location that is currently not being relied upon for data storage. Subsequently, the original memory location may become the gap. In the next wear level operation, the above described swapping of a memory location and a gap location may be repeated for the next data fragment adjacent to the gap. Repetition of these steps may eventually result in a shift of all data fragments relative to their original locations in the solid state memory region. Because the migration involves rewriting the data fragment, the migration also refreshes the data fragment. Thus, a data fragment that has been disturbed is refreshed when migrated. Those skilled in the art will recognize that alternatively or in addition, any other data fragment rewriting scheme may be employed to refresh a disturbed data fragment, without departing from the technology.

In Step 504, the divider_count variable is reset to divider_limit.

In one embodiment of the technology, the methods described in FIGS. 3-5 may be performed entirely within a storage module(s). In another embodiment of the technology, a portion of the methods described in FIGS. 3-5 may be performed on a storage module(s) while other portions of the methods described in FIGS. 3-5 may be performed by the control module.

Those skilled in the art will recognize that other methods may be executed in addition to the methods described in FIGS. 3-5. For example, a method that detects duplicate writes to the same memory locations and that performs wear level operations once a number of duplicate writes have been performed may be executed in parallel to the methods of FIGS. 3-5.

Example Use Case

The use case scenario described below is intended to provide an example of the method for mitigating write and read disturbances in solid state memory, described in FIGS. 3-5, and is for illustrative purposes only. The use case scenario is based on a system similar to the one shown in FIG. 1, in which data is written to/read from a memory region of a solid state memory module. One skilled in the art will recognize that the methods described in FIGS. 3-5 are not limited to the use case scenario described below, but rather are universally applicable to a wide range of solid state memory-based systems of different configuration, complexity and size.

Consider a scenario in which write and read operations are performed to the solid state memory shown in FIG. 1D. For the sake of simplicity, further assume that all addresses are handled in physical address space, i.e., the addresses of the memory locations, as shown in FIG. 1D are used by the methods of FIGS. 3-5. divider_limit is set to "1".

First, assume that a write is performed to memory location 7 (Step 304). Memory locations 1, 2, 3, 6, 8, 11, 12 and 13 experience a disturbance. The weight for each of the memory locations 1, 3, 11, and 13 is 0.1, and the weight for each of the memory locations 2, 6, 8, and 12 is 0.5. Thus, the weight 0.5 is stored in historical_weight (Steps 414, 416), and memory locations 1, 2, 3, 6, 8, 11, 12 and 13 are stored in disturbed history (Step 418).

Next, assume that a write is performed to memory location 29 (Step 304). Memory locations 23, 24, and 28 experience a disturbance. The weight for memory location 23 is 0.1, and the weight for memory locations 24 and 28 is 0.5. Thus, the weight 0.5 is maintained in historical_weight (Step 414), and memory locations 23, 24, and 28 are stored in disturbed_history (Step 418).

Next, assume that a read is performed in memory location 15 (Step 304). Memory locations 10, 11, and 16 experience a disturbance. The weight for memory locations 10 and 16 is 0.05, and the weight for memory location 11 is 0.01. These weights are smaller than the weights for the write operations because read operations cause less of a disturbance than write operations. A determination is made that address 11 already exists in disturbed_history (Step 406). Accordingly disturbed_history is cleared (Step 408), and divider_count is updated by subtracting (0.5+0.01; i.e., historical_weight+ current_weight) (Step 410). Accordingly divider_count becomes 0.49. Further, historical_weight is set to 0 (Step 412), and memory locations 10, 11, and 16 are stored in disturbed_history (Step 418).

Next, assume that a write is performed to memory location 10 (Step 304). Memory locations 5, 6, 11, 15 and 16 experience a disturbance. The weight for each of the memory locations 6 and 16 is 0.1, and the weight for each of the memory locations 5, 11, and 15 is 0.5. A determination is made that address 11 already exists in disturbed history (Step 406). Accordingly disturbed_history is cleared (Step 408), and divider_count is updated by subtracting (0+0.5; i.e, historical_weight+current_weight). Accordingly divider_count becomes −0.01 (Step 410). With divider count dropping below zero, a wear level operation is performed (Steps 500, 502).

Those skilled in the art will appreciate that the technology is not limited to the examples described above.

Embodiments of the technology may enable solid state storage systems to mitigate the effects of write and/or read disturbance which, when not addressed, may cause a loss of data. In a system in accordance with one or more embodiments of the technology, wear leveling is used to mitigate the effect of write/read disturbances.

In one or more embodiments of the technology, the execution of wear level operations is modulated by the number of repeatedly detected write/read disturbances, and further by the severity of the detected write/read disturbances As a result, write/read disturbances may be effectively cured without requiring an excessively high number of wear level operations. The methods, in accordance with one or more embodiments of the technology, may be used in conjunction with solid state memory that is segmented into any number of memory regions.

Embodiments of the technology may be implemented using limited resources. Specifically, a small amount of volatile memory may be sufficient to detect memory locations that are repeatedly affected by write/read disturbances. Embodiments of the technology may thus be implemented using for example, a small random access memory (RAM) region or registers, e.g. within an FPGA.

Embodiments of the technology may thus obviate the need for large tables to separately track disturbances in each of the memory locations in the memory region, without sacrificing wear level performance. The technology may thus be especially useful to manage write-in-place non-volatile memory (WiPNVM) that may have relatively small memory locations (e.g., a few bytes only), and where a table for tracking writes to individual memory locations would thus be particularly large. Local implementation, for example, directly on the FPGA or processor that establishes the interface to the memory region, may result in superior performance at a reduced cost.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for mitigating the effect of write disturbances in solid state memory, the method comprising:
   receiving a request to write to a memory location of the solid state memory;
   writing to the memory location in response to the request;
   identifying a disturbed memory location based on a weight, wherein the weight specifies a degree to which at least the disturbed memory location is affected by performing the write to the memory location, wherein the disturbed memory location stores an ambiguous state following the write to the memory location;
   identifying a memory region that comprises the disturbed memory location;
   identifying an address, in the memory region, of the disturbed memory location;
   generating, using a hash function, an address hash from the address;
   obtaining, for the memory region, a history of disturbed memory locations comprising a set of bits;
   mapping the address hash to a bit of the set of bits;
   making a first determination, based on an inspection of the bit, that the history of disturbed memory locations for the memory region comprises the address hash, and based on the first determination:
      clearing the history of disturbed memory locations; and
      making a second determination that a wear level operation is due, and based on the second determination:
         performing the wear level operation to restore the disturbed memory location to a desired state, wherein the desired state corresponds to the state of the disturbed memory location prior to the write to the memory location.

2. The method of claim 1 further comprising:
   receiving a second request to write to a second memory location of the solid state memory;
   writing to the second memory location in response to the second request;
   identifying a second disturbed memory location based on a second weight;
   identifying the memory region as further comprising the second disturbed memory location;
   identifying, in the memory region, a second address of the second disturbed memory location;
   generating, using the hash function, a second address hash from the second address;
   mapping the second address hash to a second bit of the set of bits; and
   making a third determination, based on an inspection of the second bit, that the history of disturbed memory locations for the memory region does not comprise the second address hash, and based on the third determination:
      modifying the second bit to indicate that the history of disturbed memory locations comprises the second address hash.

3. The method of claim 2, further comprising:
   receiving a third request to write to a third memory location of the solid state memory;
   writing to the third memory location in response to the third request;
   identifying the second disturbed memory location based on a third weight;
   making a fourth determination, based on another inspection of the second bit, that the history of disturbed memory locations for the memory region comprises the second address hash, and based on the fourth determination:
  clearing the history of disturbed memory locations; and
  making a fifth determination that a second wear level operation is due, and based on the fifth determination:
    performing the second wear level operation to restore the second disturbed memory location to a second desired state.

4. The method of claim 1, wherein making the second determination that the wear level operation is due comprises comparing a counter for a number of repeatedly disturbed memory locations, observed since the most recent wear level operation, to a specified threshold.

5. The method of claim 4,
  wherein the counter is updated each time a repeatedly disturbed memory location is detected.

6. The method of claim 5, wherein the update increment is adjusted based on a degree of disturbance that was caused in the disturbed memory location, by writing to the memory location.

7. The method of claim 1, further comprising, after writing to the memory location:
  identifying a second disturbed memory location based on a second weight,
    wherein the second disturbed memory location is located in a second memory region, different from the first memory region;
    wherein a second history of disturbed memory locations, comprising a second set of bits, is maintained for the second memory region to control wear level operations in the second memory region, based on detected repeatedly disturbed memory locations in the second memory region.

8. The method of claim 1, wherein identifying the disturbed memory location comprises:
  locating a memory location that is geometrically adjacent to the memory location where the write was performed.

9. A storage appliance, comprising:
  a storage module comprising solid state memory and a storage module controller,
  wherein the storage module controller is configured to:
    receive a request to write to a memory location of the solid state memory;
    write to the memory location in response to the request;
    identify a disturbed memory location based on a weight, wherein the weight specifies a degree to which at least the disturbed memory location is affected by performing the write to the memory location, wherein the disturbed memory location stores an ambiguous state following the write to the memory location;
    identify a memory region that comprises the disturbed memory location;
    identify an address, in the memory region, of the disturbed memory location;
    generate, using a hash function, an address hash from the address;
    obtain, for the memory region, a history of disturbed memory locations comprising a set of bits;
    mapping the address hash to a bit of the set of bits;
    make a first determination, based on an inspection of the bit, that the history of disturbed memory locations for the memory region comprises the address hash, and based on the first determination:
      clear the history of disturbed memory locations; and
      make a second determination that a wear level operation is due, and based on the second determination:
        perform the wear level to restore the disturbed memory location to a desired state, wherein the desired state corresponds to the state of the disturbed memory location prior to the write to the memory location.

10. The storage appliance of claim 9, wherein the storage module controller is further configured to:
  receive a second request to write to a second memory location of the solid state memory;
  write to the second memory location in response to the second request;
  identify a second disturbed memory location based on a second weight;
  identify the memory region as further comprising the second disturbed memory location;
  identify, in the memory region, a second address of the second disturbed memory location;
  generate, using the hash function, a second address hash from the second address; map the second address hash to a second bit of the set of bits; and
  make a third determination, based on an inspection of the second bit, that the history of disturbed memory locations for the memory region does not comprise the second address hash, and based on the third determination:
    modify the second bit to indicate that the history of disturbed memory locations comprises the second address hash.

11. The storage appliance of claim 10, wherein the storage module controller is further configured to:
  receive a third request to write to a third memory location of the solid state memory;
  write to the third memory location in response to the third request;
  identify the second disturbed memory location based on a third weight;
  make a fourth determination, based on another inspection of the second bit, that the history of disturbed memory locations for the memory region comprises the second address hash, and based on the fourth determination:
    clear the history of disturbed memory locations; and
    make a fifth determination that a second wear level operation is due, and based on the fifth determination:
      perform the second wear level operation to restore the second disturbed memory location to a second desired state.

12. The storage appliance of claim 9, wherein making the second determination that the wear level operation is due comprises comparing a counter for a number of repeatedly disturbed memory locations, observed since the most recent wear level operation, to a specified threshold.

13. The storage appliance of claim 12,
  wherein the counter is updated each time a repeatedly disturbed memory location is detected; and
  wherein the update increment is adjusted based on a degree of disturbance that was caused in the disturbed memory location, by writing to the memory location.

14. The storage appliance of claim 9, wherein the storage module controller is further configured to:
  identify a second disturbed memory location based on a second weight, wherein the second disturbed memory location is located in a second memory region, different from the first memory region;

wherein a second history of disturbed memory locations, comprising a second set of bits, is maintained for the second memory region to control wear level operations in the second memory region, based on detected repeatedly disturbed memory locations in the second memory region.

15. A non-transitory computer readable medium (CRM) comprising instructions, which when executed by a storage module controller, enable the storage module controller to:

receive a request to write to a memory location of the solid state memory;

write to the memory location in response to the request;

identify a disturbed memory location based on a weight, wherein the weight specifies a degree to which at least the disturbed memory location is affected by performing the write to the memory location, wherein the disturbed memory location stores an ambiguous state following the write to the memory location;

identify a memory region that comprises the disturbed memory location;

identify an address, in the memory region, of the disturbed memory location;

generate, using a hash function, an address hash from the address;

obtain, for the memory region, a history of disturbed memory locations comprising a set of bits;

mapping the address hash to a bit of the set of bits;

make a first determination, based on an inspection of the bit, that the history of disturbed memory locations for the memory region comprises the address hash, and based on the first determination:

clear the history of disturbed memory locations;

make a second determination that a wear level operation is due, and based on the second determination:

perform the wear level operation to restore the disturbed memory location to a desired state, wherein the desired state corresponds to the state of the disturbed memory location prior to the write to the memory location.

16. The non-transitory CRM of claim 15 further comprising instructions that enable the storage module controller to:

receive a second request to write to a second memory location of the solid state memory;

write to the second memory location in response to the second request;

identify a second disturbed memory location based on a second weight;

identify the memory region as further comprising the second disturbed memory location;

identify, in the memory region, a second address of the second disturbed memory location;

generate, using the hash function, a second address hash from the second address;

map the second address hash to a second bit of the set of bits; and make a third determination, based on an inspection of the second bit, that the history of disturbed memory locations for the memory region does not comprise the second address hash, and based on the third determination:

modify the second bit to indicate that the history of disturbed memory locations comprises the second address hash.

17. The non-transitory CRM of claim 16, further comprising instructions that enable the storage module controller to:

receive a third request to write to a third memory location of the solid state memory;

write to the third memory location in response to the third request;

identify the second disturbed memory location based on a third weight;

make a fourth determination, based on another inspection of the second bit, that the history of disturbed memory locations for the memory region comprises the second address hash, and based on the fourth determination:

clear the history of disturbed memory locations; and make a fifth determination that a second wear level operation is due, and based on the fifth determination:

perform the second wear level operation to restore the second disturbed memory location to a second desired state.

18. The non-transitory CRM of claim 15, wherein making the second determination that the wear level operation is due comprises comparing a counter for a number of repeatedly disturbed memory locations, observed since the most recent wear level operation, to a specified threshold.

19. The non-transitory CRM of claim 18, wherein the counter is updated each time a repeatedly disturbed memory location is detected; and wherein the update increment is adjusted based on a degree of disturbance that was caused in the disturbed memory location, by writing to the memory location.

20. The non-transitory CRM of claim 15, further comprising instructions that enable the storage module controller to, after writing to the memory location:

identify a second disturbed memory location based on a second weight, wherein the second disturbed memory location is located in a second memory region, different from the first memory region;

wherein a second history of disturbed memory locations, comprising a second set of bits, is maintained for the second memory region to control wear level operations in the second memory region, based on detected repeatedly disturbed memory locations in the second memory region.

* * * * *